P. BROWN.
BATTERY.
APPLICATION FILED MAR. 22, 1915.
1,160,491.
Patented Nov. 16, 1915.
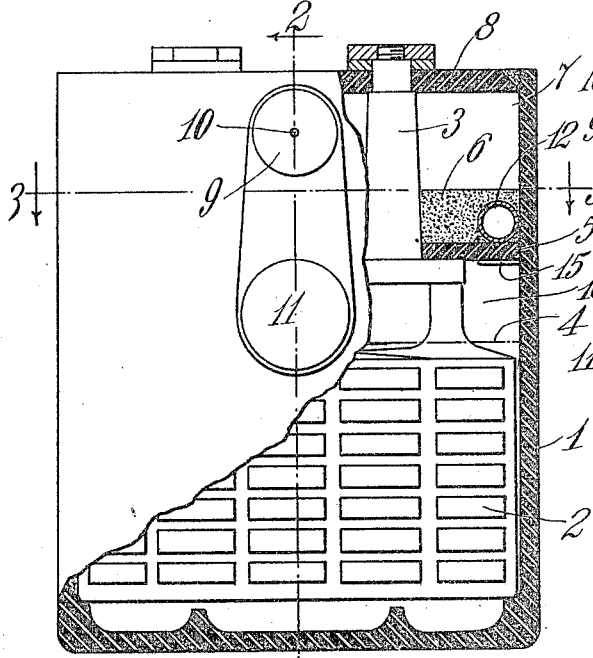
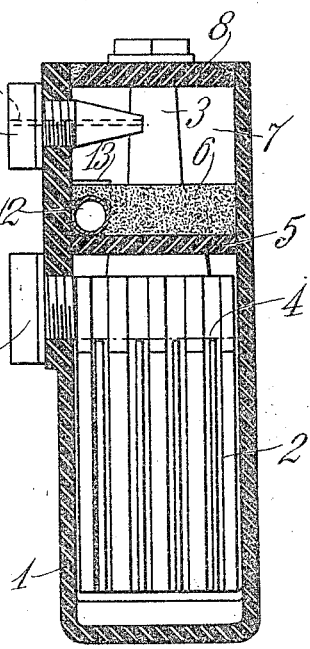
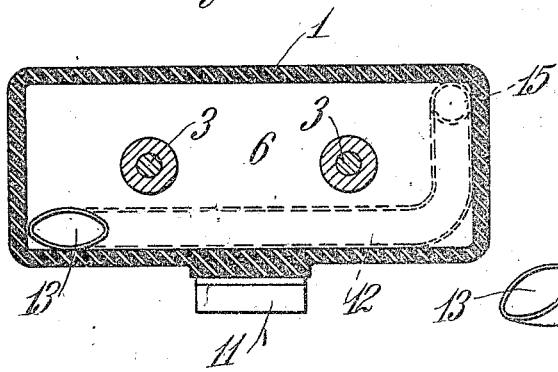
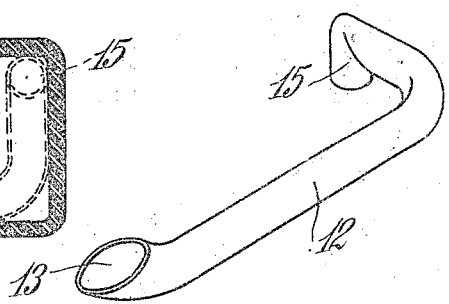
WITNESSES:
H.E. Hartwell.
INVENTOR.
Phelps Brown.
BY
Chapin & Co.
ATTORNEYS

UNITED STATES PATENT OFFICE.

PHELPS BROWN, OF SPRINGFIELD, MASSACHUSETTS.

BATTERY.

1,160,491.

Specification of Letters Patent.  Patented Nov. 16, 1915.

Application filed March 22, 1915. Serial No. 16,067.

*To all whom it may concern:*

Be it known that I, PHELPS BROWN, a citizen of the United States of America, residing in Springfield, county of Hampden, State of Massachusetts, have invented certain new and useful Improvements in Batteries, of which the following is a specification.

This invention relates to improvements in secondary batteries and particularly to the means for venting such batteries. In batteries of this type, which are usually portable batteries, it is necessary to provide some means to vent the electrolyte cell to permit the escape of gas, and it is most desirable to arrange the vent so that the escape of electrolyte from the cell is prevented in whatever position the battery may be placed.

An object of this invention is to provide a vent for a secondary battery of the type mentioned, which comprises a single pipe having one end in communication with the electrolyte cell and the other end in communication either directly or indirectly with the air. This pipe provides a suitable vent for the escape of gas and yet prevents, under ordinary conditions, the escape of electrolyte therethrough when the cell is tipped in various positions for the reason that no other inlet to the electrolyte cell is provided to permit air to enter to displace the electrolyte.

Another object is to provide a vent pipe of the class described which is of such cross-sectional area that the action of capillary attraction in withdrawing electrolyte from the cell through the vent pipe is so greatly reduced as to be a negligible factor.

A further object is to provide a vent pipe which will permit a free return flow to the cell of any electrolyte which may have escaped therefrom under abnormal conditions.

Secondary batteries of the class described are generally portable batteries and are subjected in use under normal conditions to considerable tipping and turning, whereby the electrolyte level is displaced and may assume various inclinations relative to the walls of its cell. A necessary condition in such batteries is that the electrolyte must not pass from the cell during the tipping and turning operations, and this condition is fulfilled and the escape of electrolyte prevented in the present instance by the use of a single pipe for venting purposes. This pipe, which forms the sole connection between the electrolyte cell and the atmosphere, may be likened unto the neck of a bottle and to complete the analogy the bottle may be considered as the electrolyte cell. Thus, since the cross-sectional area of the neck or vent pipe is very small in comparison to that of the bottle or electrolyte cell, liquid will not pass from the neck or vent pipe under ordinary conditions when the latter is inverted, although continued jarring will cause small quantities of liquid to leave. The jarring of a storage battery, when in an inverted position, is not usually encountered in practice and is considered an abnormal condition. It is to be noted, however, that in batteries having two vent pipes it is possible for the electrolyte to pass from one of the pipes since an air inlet may be provided by the other. Provision is made for the return of any electrolyte, which may have escaped under the abnormal conditions recited by the vent pipe of relatively large area. This pipe permits a free return flow of the electrolyte to the cell when the latter is returned to its normal position.

One preferred embodiment of my invention is shown for the purposes of illustration in the accompanying drawings, in which—

Figure 1 is a side elevational view, with parts broken away, of a secondary battery showing my invention as applied thereto; Fig. 2 is a transverse sectional view taken on the line 2—2 of Fig. 1 and looking in the direction of the arrows; Fig. 3 is a sectional plan view taken on the line 3—3 of Fig. 1 and looking in the direction of the arrows; and Fig. 4 is a perspective view showing my improved vent pipe removed from the battery.

Referring to the drawings in detail; 1 represents a container of suitable material, which has a horizontally arranged partition wall 5 hermetically sealed by suitable material 6, such as pitch or tar compounds. The container 1 is adapted to be placed within an outer protective casing. The partition 5 divides the container 1 into two compartments 7 and 16, which will hereinafter be referred to as the splash chamber and electrolyte cell, respectively.

2 represents the electrodes which are disposed within the cell 17 as shown and suitably connected by posts 3 to terminals on the top closure 8.

A screw plug 9 is threaded into one wall of the container 1 and has a hole 10 therein which communicates between the splash chamber and the atmosphere.

11 represents a threaded plug, which closes the opening in the container 1 leading to the cell 16. The electrolyte, the level of which is indicated by the dotted line 4, is introduced through this opening when the plug 11 is removed.

Fig. 4 shows in perspective the improved vent pipe 12 which is applied to the battery just above the partition 5 and is molded in the sealing material 6. This pipe 12 has an outlet 15, which extends slightly below the partition 5 into the cell 16, and is arranged in one corner of the container 1, as clearly shown in Fig. 3. From this inlet 15, the pipe is bent sharply at right angles and parallels a side wall of the container. It then is bent again at right angles and parallels a front wall and extends to a corner of the container 1 diagonal to the outlet 15. As the pipe approaches this corner, it is gradually inclined upwardly to meet the surface of the material 6 and emerges therefrom with a flaring outlet 13 (see Figs. 2, 3, and 4).

Gas in the cell 16 passes freely upwardly through the inlet 15 and emerges into the splash chamber 7 by the outlet 13. The passage 10 permits the gas to leave the chamber 7 and pass to the atmosphere, whereby a free vent is provided for the cell 16. It will be noted from the drawings that the pipe 16 is of comparatively large cross-section and is so designed as to minimize the effect of capillary attraction, which, when vent pipes of small size are used, gradually draws any electrolyte which may be in the vent pipe into the chamber 7. Due to this large vent pipe, any small quantities of electrolyte in the splash chamber will have a much freer flow back to the cell 16 than is possible where small vent pipes are used. Tipping, turning, or inversion of the battery will not cause the electrolyte to leave the cell 16 unless the battery be jarred since no means is provided for air to enter the cell 17, as heretofore described.

Thus, I have provided, with the use of a single pipe, an efficient vent for the electrolyte cell of a secondary battery in which the effect of capillary attraction is reduced to a negligible amount. Moreover, this vent pipe is arranged to permit tipping, turning, and inversion of the battery without causing the escape of electrolyte under ordinary conditions.

It is recognized that various changes may be made in the structure specifically described without departing from the scope of my invention which is defined in the appended claims.

What I claim is—

1. A battery vent comprising, a single tube which communicates with the otherwise closed gas space of a battery cell at one corner thereof, extends transversely with respect to the vertical axis of the cell to a diagonally opposite corner, and opens to the atmosphere, said tube arranged to prevent simultaneous flow of air and electrolyte therethrough, whereby leakage of the latter from the cell is prevented when the cell is tipped at any angle to its vertical axis.

2. A secondary battery, having a sealed electrolyte cell, a vent therefor comprising a single pipe which communicates with the upper portion of the cell at one corner thereof, extends transversely with respect to the vertical axis of the cell and communicates with the atmosphere at a diagonally opposite corner, whereby a vent for the cell is provided, said pipe constructed and arranged to permit tipping of the cell to any angle with respect to its vertical axis, without permitting leakage of the electrolyte therein.

3. A battery vent, comprising, a single tube which opens to the gas space of a battery cell at one corner thereof and opens to the atmosphere at the diagonally opposite corner, whereby a vent for the cell is provided, said tube being of suitable cross-sectional area to reduce capillary attraction to a negligible amount and being so arranged that air and electrolyte cannot pass simultaneously therethrough even when the cell is tipped to any angle, whereby leakage of the electrolyte is prevented.

4. A secondary battery having a splash chamber and a sealed electrolyte cell below said chamber, a vent therefor comprising a single tube opening to said cell at one corner thereof and opening to the atmosphere at an opposite corner, said tube being of such cross-sectional area that a free return flow of a small amount of liquid from said splash chamber to said cell is provided and of such cross-sectional area with reference to said cell that the electrolyte will not run out when the cell is turned at any angle.

PHELPS BROWN.